United States Patent [19]

Banke

[11] 4,129,118

[45] Dec. 12, 1978

[54] METHOD AND APPARATUS FOR PROVIDING DIFFERENTIAL TEMPERATURE THERMOSTAT CONTROL FOR SOLAR HOT WATER SYSTEMS

[75] Inventor: Kerry O. Banke, La Mesa, Calif.
[73] Assignee: Samuel G. Dawson, El Cajon, Calif.
[21] Appl. No.: 707,943
[22] Filed: Jul. 23, 1976
[51] Int. Cl.$^2$ ............................................... F24J 3/02
[52] U.S. Cl. ............................ 126/271; 236/91 A; 307/359
[58] Field of Search ............... 237/1 A, 8 R; 126/270, 126/271, 400; 236/91 A, 91 F, 78 B, 91 G; 307/359; 73/342; 165/18; 219/497, 499

[56] References Cited

U.S. PATENT DOCUMENTS

| 3,931,806 | 1/1976 | Hayes | 165/18 |
| 3,986,489 | 10/1976 | Schlesinger | 126/270 |
| 3,998,207 | 12/1976 | Watt | 126/271 |
| 4,019,495 | 4/1977 | Frazier et al. | 126/271 |

Primary Examiner—William E. Wayner
Attorney, Agent, or Firm—Brown & Martin

[57] ABSTRACT

Detecting the temperature of water moving from a solar collector to a hot water storage and detecting the temperature of the water in the hot water storage by thermistor devices, comparing the resistance differences of the thermistor devices and providing a voltage proportional to the differences and comparing the voltage with a reference voltage providing a first output difference signal. Comparing the first output signal in a differential amplifier device with a second reference voltage providing an output for opening and closing a switch circuit to a pump when the temperature differential exceeds or is less than a given amount. Also detecting by a third thermistor the temperature of the water in the solar collector and then comparing the resistance of the third thermistor relative to a standard resistance providing a control voltage to the second differential amplifier. This provides an output signal that also opens or closes the pump switch circuit in response to the temperature of the water in the solar collector falling below a given temperature. The system also selectively changes the second reference voltage in response to the switch to the pump being opened and closed, so that the pump is energized at or above a given water temperature differential between the solar collector and the hot water storage, and is de-energized when the temperature differential is a lesser amount.

10 Claims, 2 Drawing Figures

METHOD AND APPARATUS FOR PROVIDING DIFFERENTIAL TEMPERATURE THERMOSTAT CONTROL FOR SOLAR HOT WATER SYSTEMS

BACKGROUND OF THE INVENTION

With the advent of solar heating units for heating water, it is desirable to provide control systems for controlling the flow of water between a solar collector heater and a hot water storage unit. When the solar collector is receiving sufficient sunlight to heat the water to a temperature above that in a hot water storage, then it is desirable and efficient to move the water in a flow from the solar collector to the hot water storage. There are other times however when it is undesirable, such as at night or when there is little sunshine or when the ambient temperature is cold, to move water from the solar collector to the hot water storage. At the latter times, it is desirable to de-energize the pump pumping water between the solar collector and the hot water storage. Also it is desirable to selectively energize the pump only when there is a given temperature differential between the water leaving the solar collector and the water in the hot water storage. Further it is desirable to turn off the pump when the difference between the temperature of the water leaving the solar collector and that in the hot water storage is less than temperature differential set to energize the pump. This prevents oscillatory energizing of the pump motor with minute changes in relative temperatures of the water in the solar collector and in the hot water storage. Still further it is also desirable to have means for separately detecting the temperature of the water in the solar collector so that regardless of the differential in the temperature between the water in the solar collector and the hot water storage, any time the water in the solar collector falls below a given temperature, such as for example 70°, the pump is de-energized.

It is therefore advantageous to have a differential temperature control for selectively energizing and de-energizing a pump motor at the appropriate times, and for the appropriate temperature differentials between water in the solar collector and water in the hot water storage. It is further advantageous to have a efficient circuit for accomplishing the foregoing.

SUMMARY OF THE INVENTION

In an illustrative embodiment, a first means employing a first thermistor detects the temperature of the water in a hot water storage unit. A second means employing a second thermistor detects the temperature of the water in the solar collector. The first means and second means provide first and second electrical conditions that are the resistance changes in the thermistors in response to the respective detected water temperatures. These differences in resistance are detected in a bridge circuit providing proportional voltage to an amplifier that in turn provides an output signal voltage proportional to the difference in the resistances of the thermistors to a second differential means. The second differential means compares the output signal voltage with a reference signal voltage and provides a control signal to energize a pump motor switch when the differential between the respective resistances of the two thermistors exceeds a given amount. When the differences in temperatures and thus first and second thermistor resistances do not exceed a given amount, then the second differential means is de-energized, thus de-energizing or opening the pump motor switch. This turns off the pump.

The reference signal voltage has a circuit means that selectively varies the reference voltage in response to the motor switch circuit being open or closed. Thus there is one reference voltage for energizing the motor by closing the switch circuit, and a second reference voltage for de-energizing the motor and opening the switch circuit. This permits the motor to be energized for a given temperature differential, of, for example, 10° between the water in the solar collector and the water in the hot water storage; and for de-energizing the pump motor when the temperature differential is, for example, 5° or a lesser amount between the water temperature in the solar collector and the temperature in the hot water storage.

The method and apparatus of the control circuit also provides a third means comprising a third thermistor for detecting the temperature of the water in the solar collector and providing an output signal when the temperature of the water in the solar collector falls below a given temperature. The resistance of the third thermistor is thus compared with a set resistor to provide a second output signal from an amplifier, when the resistance of the third thermistor increases to a given magnitude. The output of the amplifier is then fed to the second differential means to de-energize the second differential means and thus open the switch circuit to the pump motor.

Thus the control circuit provides output signals through changes in resistances of respective thermistor devices and circuits, that are detected by differential amplifiers in comparison with reference voltages. These output signals provide the energizing and the de-energizing of a controlled differential amplifier, whose output opens and closes a switch circuit for energizing and de-energizing the pump for pumping water between the solar collector and the hot water storage.

It is therefore an object of this invention to provide a new and improved method and apparatus for providing differential temperature thermostat control for solar hot water systems.

Other objects and many advantages will become more apparent upon a reading of the following detailed description and an examination of the drawings, wherein like reference characters will designate like parts throughout and in which.

Figure 1:
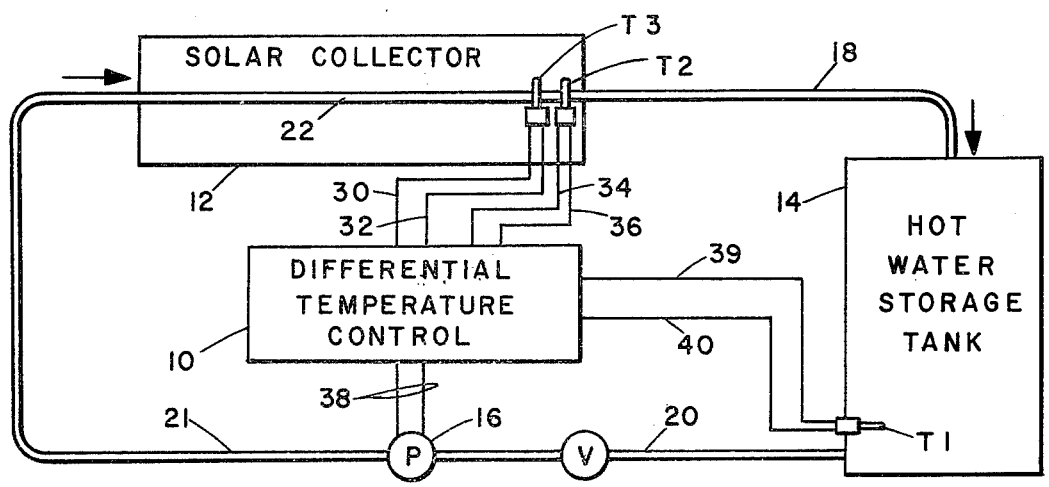
FIG. 1 illustrates an operation embodiment of the invention.

Referring to FIG. 1 of the drawing a hot water storage tank 14 stores water that is heated by a known solar collector 12. The hot water in the storage tank may also be additionally heated by other means, such as known gas burners or the like, and the hot water received from the solar collector 12 may be supplementary or the primary source.

When the temperature of the water in the hot water storage tank 14 as detected by thermistor $T_1$ is less by a given set amount than the temperature of the water leaving the solar collector 12 through line 18, as detected by thermistor $T_2$, then the pump 16 is energized by the differential temperature control 10 in a manner that will be described in more detail hereinafter. Pump 16 pumps water through line 20, check valve 23, line 21 into lines 22 in the solar collector 12. The water is heated in lines 22 in the solar collector 12 in the manner known in the art. The temperature of this water leaving the solar collector 12 is detected by thermistors $T_3$ and $T_2$. The water then passes through line 18 to the hot water tank 14.

In a specific example, when the temperature of the water in the solar collector 12 exceeds the temperature of the water in the storage tank 14 by a differential of 10°, then differential temperature control 10 switches on pump 16. Pump 16 continues to operate, circulating the water through hot water storage tank 14 until the temperature differential from the water leaving the solar collector 12 and that in the lower portion of the hot water storage tank 14 is less than 5°. This is detected by the differential temperature control 10 through thermistors $T_1$ and $T_2$, and in response the differential temperature control 10 switches off pump 16. Check valve 23 prevents flow of fluid back into the hot water tank, thus maintaining a head where necessary on the pump 16.

Figure 2:
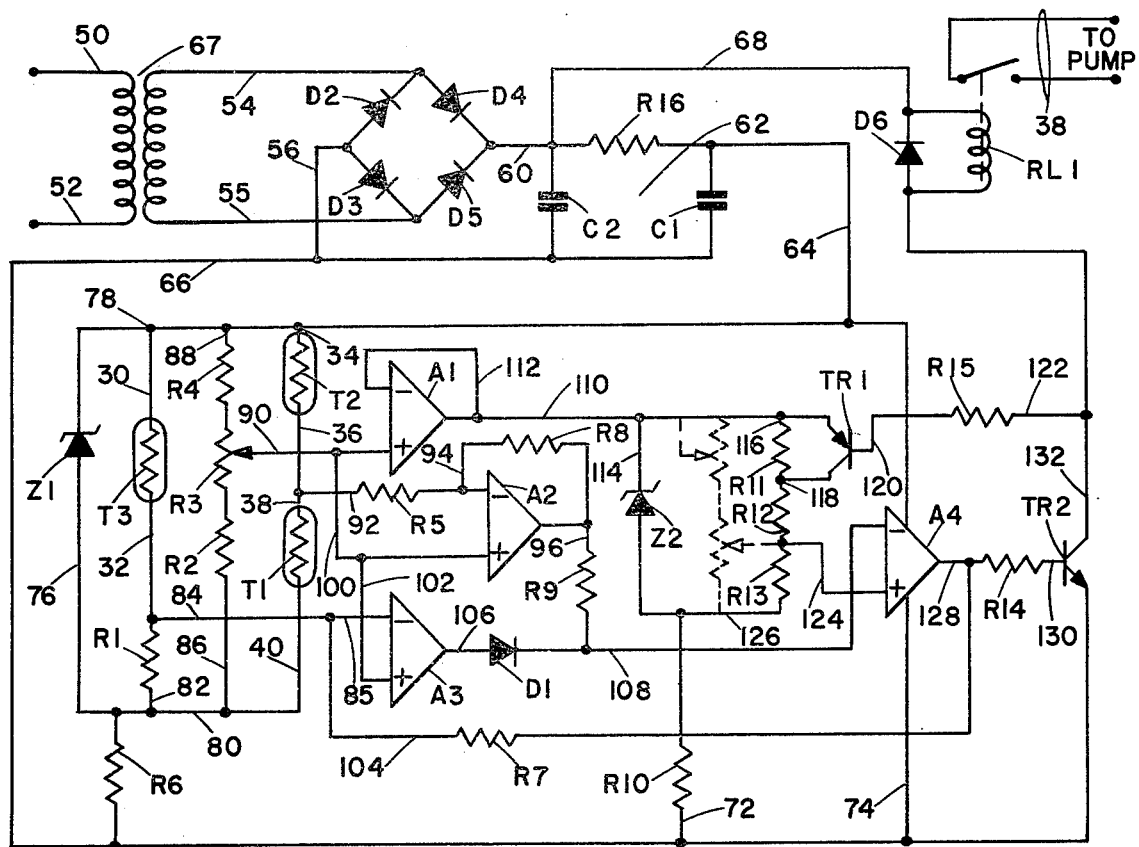
FIG. 2 is a circuit block and schematic diagram of the differential temperature control unit.

Referring now to FIG. 2, the operation of the differential temperature control 10 is powered by a normal 110 AC power supply. This power is fed through lines 50 and 52 to transformer 67. Transformer 67 reduces the 110 AC voltage down to, for example, 10 volts AC in lines 54 and 55. A full wave rectifier circuit comprising diodes D2, D3, D4, and D5 provide a rectified DC voltage to respective lines 56 and 60. The DC voltage is fed then through lines 64 and 66 to the control circuit 11 of the differential temperature control 10 and through line 68 to the pump motor relay RL1. The control voltage in line 64 is filtered by the filter circuit comprising resistor 16 and capacitors C1 and C2.

The input voltage to the control circuit 11 is fed through line 64 and line 78 to one side of zener diode Z1. The other side of the power circuit is fed through line 66, zener regulator resistor R6 and line 76 to the zener diode Z1. The voltage drop across the zener diode may, for example, be 5.8 volts, which sets the voltage across the control portion of the circuit 10 between lines 78 and 80.

In the operation of the control circuit, when transistor TR2 is energized, current passes through switch relay RL1 that closes switch 41 in pump motor control line 38. This operates the pump 16. Diode D6 protects the relay RL1 against overload. Transistor TR2 is energized by base current from differential amplifier A4 that passes through biasing resistor R14 and line 130. To energize amplifier A4, a reference voltage is supplied through line 124. This reference voltage has two selective levels or two reference voltages, which provide the differential control of 10° and 5° as previously described. The reference voltages are picked off by potentiometer R3 that is connected by lines 88 and 86 across the input potential in lines 78 and 80. Balanced current limiting resistors R2 and R4 limit the current flow in the circuit. Potentionmeter R3 feeds a voltage through line 90 to the plus side of the operational amplifier A1. This voltage may, for example, be 2.9 volts. This voltage is also fed through line 100 to the plus side of the operational amplifier A2. The operational amplifier A1 has a feed-back line 112. The output of the amplifier A1 is fed through line 110, and through line 114 to zener diode Z2 and to the emitter of the PNP transistor TR1. Voltage is also impressed through line 116 across resistor R11 and resistor R12 to line 124. The voltage in line 124 is that set by the resistance bridge circuit of resistor R11, R12 and R13. The latter resistor R13 is connected through line 126, resistor R10 and line 72 to the power line 66. The voltage in line 124 may be any suitable set voltage for operation of amplifier A4 under operational conditions.

The second bridge circuit is connected across line 34, thermistor $T_2$, line 36, line 38, thermistor $T_1$, and line 40 in parallel with the zener diode Z1, and has a potential drop of, for example, 5.8 volts. Thermistor $T_2$ is positioned in the solar collector, see FIG. 1, with thermistor $T_1$ positioned in the hot water storage tank. These thermistors circuits are such that when the temperature decreases the resistance of the thermistor increases. The difference in resistance or electrical conditions between the solar collector thermistor and the storage tank thermistor provides a differential in voltage in the line circuit 92, that is compared with the standard 2.9 volts in line 100 to provide a first control voltage when a sufficient differential exists. When the resistance of thermistor $T_2$ is greater than the resistance of thermistor $T_1$, then this indicates that the temperature of the water leaving the solar collector through line 18 is at a lower temperature than the water in the hot water tank 14. This provides a lower voltage in line 92 through resistor R5 that increases the output signal of amplifier A2 to a sufficient level that the output signal through line 96, resistor R9, line 108 to the negative side of the differential amplifier A4 de-energizes differential amplifier A4. This cuts off the biasing current through line 128, resistor R14 and line 130 to the base of the NPN transistor TR2.

Further when the temperature of the water in the solar collector is going downwardly, then the resistance of thermistor $T_3$ in the circuit relative to resistor R1 is increasing. After the temperature has dropped sufficiently, such as for example to 70° F., then the resistance of $T_3$ is sufficiently larger than the resistance R1, that the voltage in line 84 and line 85 to the negative input of operational amplifier A3, is sufficient to turn amplifier A3 on. This provides an output signal through line 106, diode D1, line 108, to the negative side of the amplifier A4, that raises the voltage in the negative input to amplifier A4 sufficiently to shut down amplifier A4. Accordingly, when the temperature of the water in the collector drops to a temperature of above 70°, then differential amplifier A4 is de-energized or its output is dropped below that of the bias voltage of the base of transistor TR2 and transistor TR2 is de-energized, opening the line circuit to relay RL1 and de-energize the pump motor or pump 16. Line 104 through resistor R7 provides positive feedback to amplifier A3 to provide a snap back clean turn on and turn off on the operational amplifier A3.

It may be understood that while amplifier A3 is full on or full off output amplifier, amplifier A2 has an analog linear output. When, however, the input differential is sufficient, corresponding to the 10° differential between thermistors $T_2$ and $T_1$, then the output magnitude of A2 is sufficient to energize amplifier A4. This is set by the magnitude of the reference voltages. When amplifier A4, subject to this temperatuer differential, is energized and transistor switch TR2 is closed, then the motor circuit is closed. When the motor circuit 132 is open, there is a sufficient voltage level through line 122, resistor R15 and line 120 to de-energize transistor TR1. However, when transistor switch TR2 is closed, then this drops the potential voltage in line 132 and thus in the base line 120 of transistor TR1. This energizes transistor TR1 shorting out resistor R11 and creating a new or second reference voltage in line 124 to differential amplifier A4, raising the plus voltage and requiring a larger temperature differential between the solar collector thermistor $T_2$ and the storage thermistor $T_1$ to energize the pump 16.

This, in operation, when the temperature of thermistor $T_3$ is above 70°, then the resistance is sufficiently low that amplifier A3 is de-energized. However, when the temperature on thermistor $T_3$ drops below 70°, this increases the resistance and decreases the voltage in line 108, thus turning on amplifier A3 and de-energizing amplifier A4. Also, when the temperature of the thermistor $T_2$ exceeds the temperature of the thermistor $T_1$ in the storage tank by at least 10°, this reduces the resistance of thermistor $T_2$ relative to thermistor $T_1$ keeping the voltage relatively high on line 92 and keeping amplifier A2 de-energized. Thus in initial operation, any time the temperature of thermistor $T_2$ exceeds the temperature of thermistor $T_1$ by 10°, then amplifier A2 is de-energized and amplifier A4 is energized closing transistor or switch TR2. When this occurs, then this energizes transistor TR1 shorting out resistance R11 and thus increasing the reference voltage in line 124 to the plus side of the operational amplifier A4 to the second reference signal voltage.

When the temperature decreases on thermistor $T_2$, this increases its resistance, thus lowering the voltage in line 92. When this voltage is reduced to that corresponding to a temperature differential between thermistor $T_2$ and thermistor $T_1$ of less than 5°, then the voltage in line 92 is decreased to the degree that amplifier A2 provides an output signal voltage in line 108 sufficient to de-energize amplifier A4, against the second reference voltage thus de-energizing transistor TR2 and opening the switch to the pump motor circuit. The pump motor circuit is thus de-energized and all transfer of the colder water from solar collector 12 to the hot water storage tank 14 is stopped. So hot water is only transferred from the solar collector 12 to the hot water storage tank 14 through line 18 when initially there is a 10° differential between the two temperatures, at which time pump 16 continues operation until the water temperature differential between the solar collector and the lower portion of the hot water storage tank 14 comes within 5°, at which time the pump 16 is de-energized. Further, pump 16 is also de-energized at any time the water in the solar collector 12 drops below a temperature of 70°.

Having described my invention, I now claim:

1. A differential temperature control for controlling the moving of water between a solar collector and a hot water storage comprising:

first means for detecting the temperature of the water in the hot water storage and providing a first electrical condition proportional to the storage water temperature, second means for detecting the temperature of the water leaving the solar collector providing a second electrical condition proportional to the solar water temperature, first differential means for comparing said first and second electrical conditions and providing an output signal when said solar water temperature exceeds said storage water temperature a first given amount, reference means for providing at least one reference electrical signal, second differential means for comparing said output signal and said reference signal and providing a first control signal when the difference between said output signal and said reference signal exceeds a given magnitude and a second control signal when the difference between said output signal and said reference signal is less than a given magnitude, switch circuit means for being closed in response to one of said control signals and being opened in response to the other of said control signals, said reference means including means for providing a first reference electrical signal in response to said switch being open and for providing a second reference electrical signal in response to said switch means being closed, and said second differential means comparing said output signal with said first reference signal and providing a control signal when the difference between said output signal and said first reference signal exceeds a given magnitude, and comparing said output signal with said second reference signal and providing a control signal when the difference between said output signal and said reference signal exceeds a given magnitude.

2. The differential temperature control as claimed in claim 1 including:

third means for detecting the temperature of the water in the solar collector and providing a third electrical condition when said solar water temperature is lowered below a given temperature, third differential means for comparing said third electrical condition with a standard condition and providing a second output signal when said solar water temperature drops below said given low temperature, and means for supplying said second output signal to said second differential means for comparison with said reference signals to provide a third control signal when the difference between said third condition and said standard condition is greater than a given magnitude.

3. A differential temperature control as claimed in claim 1 wherein:

said first means comprises a first thermister and said second means comprising a second thermister, said first and second thermisters being connected in a bridge circuit, and said first differential means comprising a differential amplifier for comparing the voltage level between said thermisters with a given voltage.

4. A differential temperature control as claimed in claim 3 wherein:

said second differential means comprising a second differential amplifier for comparing the output of said first differential amplifier with said reference electrical signal.

5. A differential temperature control as claimed in claim 4 wherein:

said reference means comprising a resistence bridge circuit having a series connected potentiometer, amplifier means for amplifying said potentiometer output to a second resistence bridge circuit, and means for providing a reference voltage from said second bridge circuit to said second differential means.

6. A differential temperature control as claimed in claim 5 wherein:

a switch circuit responsive to said first and second control signals for opening and closing the switch circuit, and means responsive to the closing of the switch circuit for switching a resistence out of said resistence bridge circuit and increasing the magnitude of said reference voltage to said second differential means.

7. A differential temperature control as claimed in claim 6 including:
a third resistence thermister bridge circuit,
means for comparing the differential voltage drop across said thermister and said resister in said third resistence circuit,
amplifier means responsive to said differential for providing an amplified signal to said second differential means,
and said second differential means being responsive to said third amplified signal for providing a control signal for opening said switch circuit.

8. A differential temperature control as claimed in claim 7 including:
pump means responsive to the closing of said switch circuit for pumping water between the solar collector and the hot water storage.

9. The method of providing a differential temperature control for controlling the movement of water between a solar collector and a hot water storage comprising the steps of:
detecting a first temperature of the water in the hot water storage by first thermister means and detecting a second temperature of the water leaving the solar collector to the hot water storage by a second thermister means,
determining the relative resistance difference of the first and second thermisters thus comparing said first and second temperatures,
converting this difference into an electrical signal having a magnitude proportional to the difference and thus a magnitude proportional to the temperature differences,
comparing said voltage magnitude of the electrical signal with a reference voltage and providing an output voltage when said two voltages have a sufficient difference magnitude, which output voltage energizes the pump for pumping water between the solar collector and the hot water storage in response to said given set differential magnitude between the first and second electrical signals representing the first and second temperatures,
subsequently comparing said voltage magnitude of the electrical signal with a second reference voltage,
and providing a second output voltage when said subsequent comparison indicates a representative differential mangitude greater than a given amount relative to said second reference voltage, thereby selectively changing the reference voltages for comparison with the differential mangitudes represented by the temperatures of the solar collector and water storage, thus lowering the required temperature for shutting off the pump to a level lower than the temperature required for turning on the pump.

10. The method claimed in claim 9, including the steps of:
detecting separately the temperature of the water in the solar collector and providing a third signal representative thereof,
comparing this signal with a reference signal representative of a given temperature to produce a differential signal and,
providing a third output when said differential signal exceeds a given amount for shutting the pump off when the third detected temperature is below said given temperature.

* * * * *